United States Patent [19]

Beer et al.

[11] Patent Number: 5,330,021
[45] Date of Patent: Jul. 19, 1994

[54] POWER STEERING SYSTEM FOR VEHICLES

[75] Inventors: Wilhelm Beer, Ruesselsheim; Juergen Balz, Wiesbaden, both of Fed. Rep. of Germany

[73] Assignee: Alfred Teves GmbH, Fed. Rep. of Germany

[21] Appl. No.: 927,301
[22] PCT Filed: Jan. 20, 1992
[86] PCT No.: PCT/EP92/00101
   § 371 Date: Sep. 22, 1992
   § 102(e) Date: Sep. 22, 1992
[87] PCT Pub. No.: WO91/11862
   PCT Pub. Date: Aug. 8, 1991

[51] Int. Cl.⁵ .................................... B62D 5/04
[52] U.S. Cl. ........................................ 180/79.1
[58] Field of Search .................................. 180/79.1

[56] References Cited

U.S. PATENT DOCUMENTS 4,890,683 1/1990 Matsuda et al. ................. 180/79.1
5,010,970 4/1991 Yamamoto ....................... 180/79.1
5,021,721 6/1991 Oshita et al. .................. 180/79.1 X
5,048,852 9/1991 Chikuma et al. ................ 180/79.1 X

FOREIGN PATENT DOCUMENTS 3106088  9/1982  Fed. Rep. of Germany .
3835955  3/1988  Fed. Rep. of Germany .
3905102  8/1990  Fed. Rep. of Germany .
0094061  4/1989  Japan ........................... 180/79.1
0124365  5/1990  Japan ........................... 180/79.1
3159872  7/1990  Japan ........................... 180/79.1
2030943  9/1978  United Kingdom .
2230749  10/1990 United Kingdom .

Primary Examiner—Margaret A. Focarino
Assistant Examiner—Victor E. Johnson
Attorney, Agent, or Firm—J. Gordon Lewis; Robert P. Seitter

[57] ABSTRACT

The invention is related to an electromechanical power steering system (1) for vehicles whose servomotor (5) is positioned in the passenger compartment (2) in order to protect it from negative effects, such as mud, oil, fuel or similar which customarily exist in the engine compartment.

15 Claims, 5 Drawing Sheets

POWER STEERING SYSTEM FOR VEHICLES

BACKGROUND OF THE INVENTION

The invention is related to a power steering system for vehicles.

A power steering system of the general kind of this invention is disclosed in German patent application DE-A-3,824,424. In this power steering system the servomotor is positioned coaxially or beside the steering column, however it is positioned in the engine compartment of the vehicle.

This can create problems for the power steering system because of possible soiling of the engine compartment and with regard to elevated temperatures in the engine compartment which may have detrimental effects on the electric servomotor.

In particular in heavy commercial vehicles, such as soil moving machines and similar vehicles, the functional parts are subject to heavy soiling because they are accommodated in the engine compartment which is generally not closed for cooling purposes. An individual mud protection means for specific functional parts is generally expensive, although it is necessary in order to maintain certain parts in operative condition in the known systems.

SUMMARY OF THE INVENTION

It is, therefore, an object of the present invention to create a power steering system for vehicles which avoids the forementioned problems and, thus, prevents negative effects on the electric servomotor due to soiling and affords an arrangement offering more ease of mounting. Another object of the present invention is to provide a power steering system that is suited for incorporation of a sensor unit which recognizes the steering direction. This sensor unit is to feature a set-up which is compact, easy to integrate as well as failure-safe and inexpensive.

The power steering system of the present invention accommodates the servomotor in the passenger compartment so that there are no negative effects on the servo motor because of soiling existing in the engine compartment due to oil, fuel, engine cleaner, etc., moisture and excess temperatures.

The inventive power steering system, moreover, has the advantage of a more light-weight design, which is, then, cheaper and, consequently, more economic and easier to mount in comparison to the conventional power steering systems.

In a preferred embodiment, the electronic system of the motor is accommodated in the passenger compartment, which further simplifies mounting of the power steering system.

It is preferred to position the servomotor and the associated electronic system in the immediate vicinity of the steering wheel, or in an alternative version to integrate them in the steering wheel, for which purpose the servomotor is preferably a disc rotor-type or a travelling wave-type motor which represent especially small and flat motor variants.

For the protection of the servomotor and of the electronic system of the motor, a housing is provided which may, for example, be fixed beneath the steering wheel and the steering axle to the latter's guide tube. These locations are easily assessible so that both the initial assembly and repair work can be easily performed.

In a further preferred embodiment of the present invention, the servomotor meshes with a toothed rim which is integrated in the steering wheel. The latter offers the advantage that, on one hand, the necessary steering speed reduction and, on the other hand, simultaneously the required sensing are rendered possible.

One of the particular advantages of the invention is, above all, the ability to create a retrofittable, interchangeable unit which is preferably composed of the steering wheel, electric motor, integrated toothed rim and a sensor device. In this way, an existing vehicle can be equipped with a power steering system simply by interchanging the old steering wheel with the power steering unit.

It is an advantage for these purposes to separate in the steering wheel the steering gear and the handwheel which is required for sensing.

Furthermore, a collector-free electronically commutated electric motor is preferably utilized for this purpose. An electric motor of this kind cannot jam and is coupled directly without intermediate coupling. The toothed rim and the steering handwheel interact with the sensor unit in such a way that depending on the sense of rotation and on the torque applied, the servomotor is initiated for the generation of electromechanical auxiliary power if necessary.

The use of a collector-free, that is to say, of an electronically commutated electric motor has the advantage of obviating a coupling between the servomotor and the toothed rim without the risk of jamming the steering system in the event of motor failure.

Expedient embodiments of the invention will be illustrated and explained in more detail below as well as further features and advantages of the invention.

DETAILED DESCRIPTION OF THE INVENTION

Figure 1:
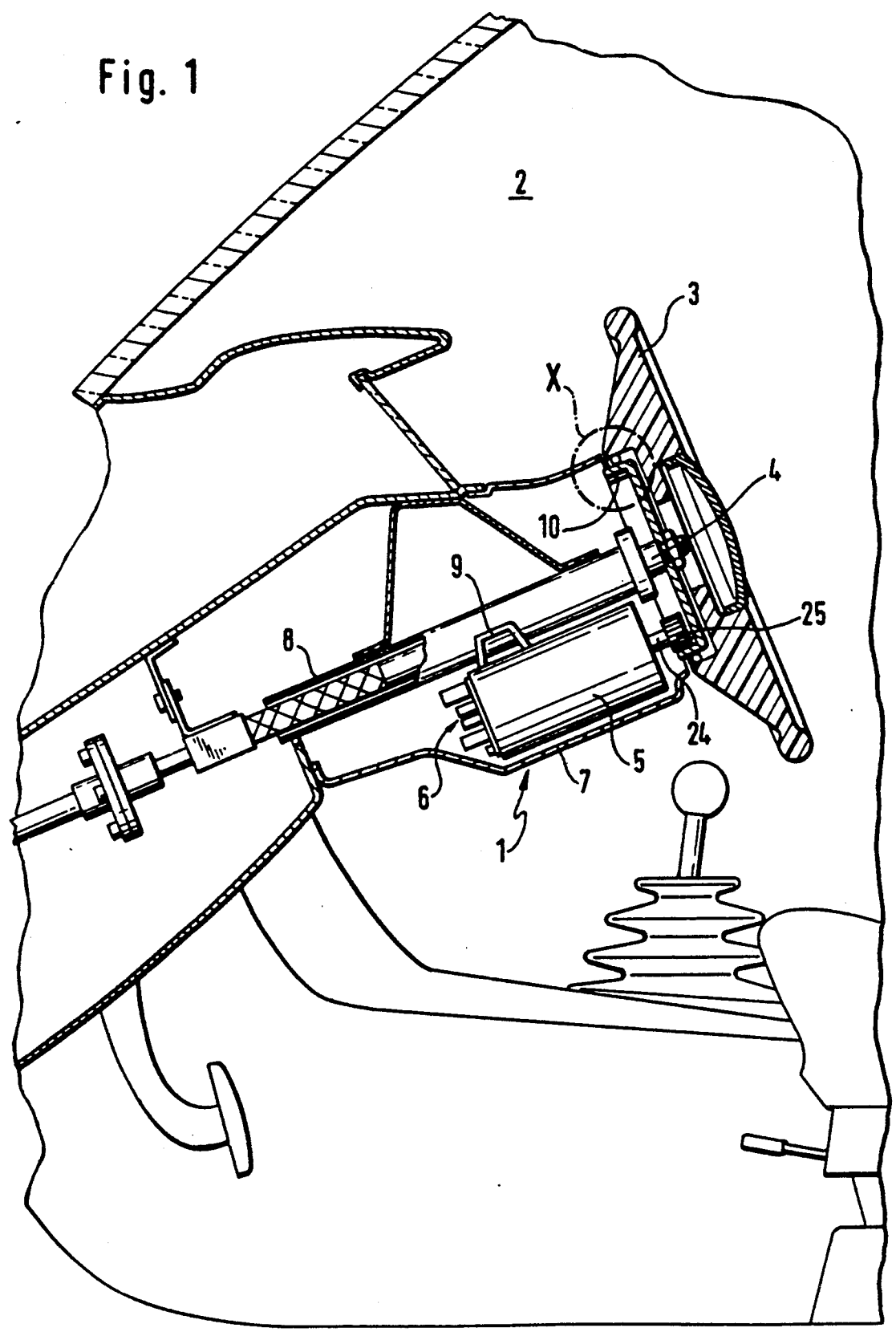
FIG. 1 shows a diagrammatic, slightly simplified representation of a part of the inventive power steering system.

In FIG. 1 one embodiment of the present invention is generally shown at 1 for vehicles with a passenger compartment 2. The power steering system 1 is disclosed as an electromechanical steering system and is provided with a steering wheel 3 which is mounted to a steering axle 4.

The power steering system 1 includes a steering gear which is not illustrated in detail in FIG. 1. The steering gear is connected to the steering axle 4.

It should be appreciated that the inventive power steering system 1 includes all other parts which are customarily envisaged for the connection and for the transmission of the steering torque from the steering axle 4 to the steering wheels.

In FIG. 1 moreover an electric servomotor 5 with an electronic system 6 is visible. The servomotor 5 generates a torque at the steering axle 4 and at the steering gear assisting the rotary motion at the steering wheel 3.

According to the invention, the servomotor 5 and in the preferred embodiment illustrated in FIG. 1 the electronic system 6 of the motor are accommodated in the passenger compartment. In the illustrated embodiment both the servomotor 5 and the electronic system 6 of the motor are positioned in the immediate vicinity of the steering wheel 3. In this embodiment, a housing 7 is provided for this purpose which is fixed in an appropriate manner, for example by means of a mounting bracket 9, to a guide tube 8 of the steering axle 4 beneath the latter. The housing 7 protects the servomotor 5 and the electronic system 6 of the motor from damage and the like.

As is visible in FIG. 1, the arrangement of the servomotor 5 and of the electronic system 6 of the motor beneath the steering axle 4 results in an easily accessible accommodation in the passenger compartment 2 so that assembly and repair work can be performed with ease.

In an alternative embodiment, not illustrated in FIG. 1, it is possible to integrate the servomotor and, if desired, the electronic system of the motor in the steering wheel 3. In this embodiment, the servomotor would preferably be an extremely flat-dimensioned electric motor, such as, for example, a disc rotor-type or a travelling wave-type motor.

Figure 2:
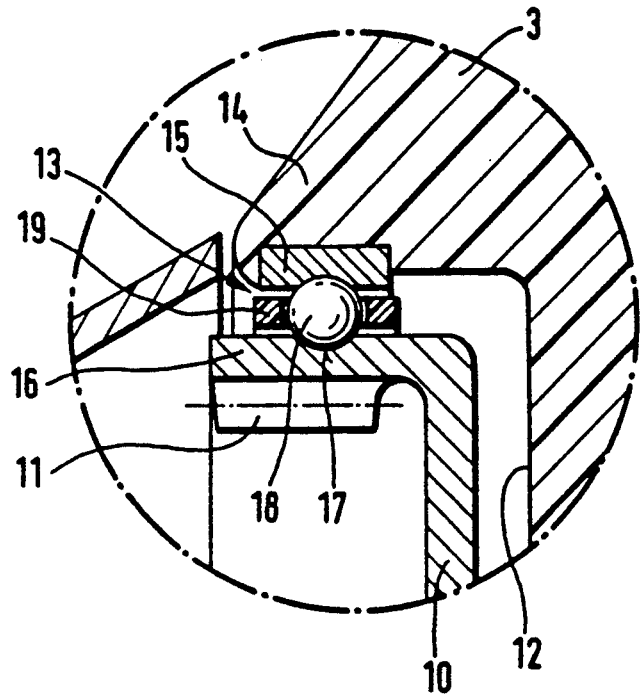
FIG. 2 shows the detail marked X in FIG. 1 in a cross section.
Figure 3:
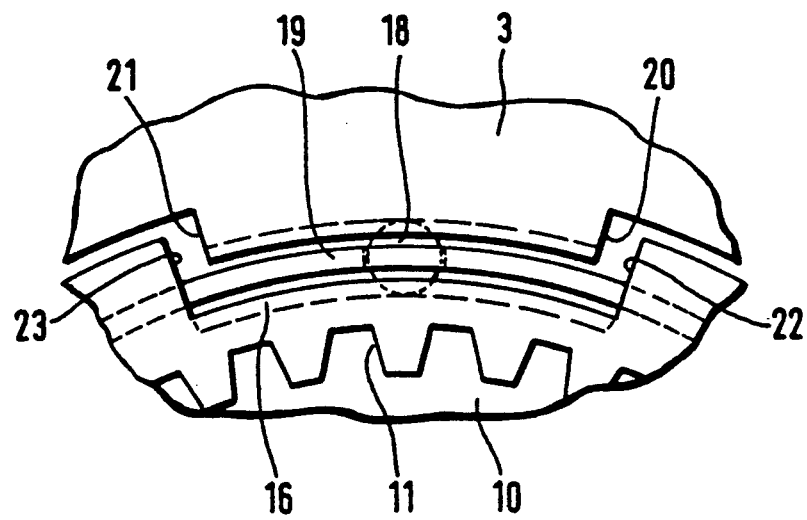
FIG. 3 shows the detail marked X in FIG. 1 in a front view.

In the illustrated embodiment, however, in which the servomotor 5 is positioned beneath the steering axle 4, the steering wheel 3 is furnished with an integrated toothed rim 10 which according to the representation in FIG. 2 is provided with an internal toothing 11. The toothed rim 10 is mounted to the steering axle 4. For the accommodation of the toothed rim 10, the steering wheel 3 is formed with a recessed section 12 to accommodate toothed rim 10. Within the accommodating recess 12, the toothed rim 10 is coupled to the steering wheel 3 through a bearing 13 which is illustrated in FIGS. 2 and 3. For this purpose, bearing 13 is provided with an external ring 15 positioned in a wall section 14, and toothed rim 10 is furnished with a bearing depression 17. A bearing 18 such as for example a ball bearing is mounted in depression 17. Depression 17 is formed in circumferential ring-shaped collar 16 which is furnished with said internal toothing 11. The ball bearing 18 is guided with the aid of a cage 19.

With reference to FIG. 3 it can be seen that the steering wheel 3 is formed with two stops 20 and 21 which are opposed to associated stops 22 and 23 on the toothed rim 10. In this way, pairs of stops 20, 22 and 21, 23 are constituted which interact for the torque transmission when the steering wheel 3 is rotated while the servomotor 5 is inoperable.

Moreover, it will clearly appreciated from FIG. 1 that the servomotor 5 is furnished with a driven shaft 24 on which a driving pinion 25 is mounted. The driving pillion 25 constantly engages the internal toothing 11 of the toothed rim 10.

If and when during operation the steering wheel 3 is rotated into one of the possible senses of rotation, a rotation of the steering wheel 3 with respect to the steering axle 4 and to the toothed rim 10 will come about. This rotation is monitored by a suitable sensor which will appropriately be integrated in a space-saving manner directly in the housing 7 of the servomotor 5 and of the electronic system 6 of the motor and will generate a steering signal.

The steering signal will be transmitted to the electronic system 6 of tile motor through lines which are not shown in detail in the Figure. Accordingly, the electronic system 6 of the motor will initiate the servomotor 5, which depending on the desired steering direction and on the corresponding steering torque, will subsequently generate an analogously directed assisting torque transmitted through the driving pinion 25 to the toothed rim 10. This torque being transmitted through the toothed rim 10 to the steering axle 4 results in auxiliary power which represents the servo assistance of the inventive power steering system 1 when the steering wheel 3 is manipulated.

Beyond the advantages already described; the inventive power steering system 1 offers the particular advantage that an easy retrofitting of an already existing steering system becomes possible by replacing the existing steering wheel with a steering wheel unit corresponding to the unit described above (steering wheel 3, toothed rim 10, motor and electronic system). Thereupon, the servomotor 5 and the associated electronic system 6 of the motor with the necessary connections can be installed in the passenger compartment 2 in a simple manner, in the manner described above, without additional modifications of the existing components of the steering system.

Figure 4:
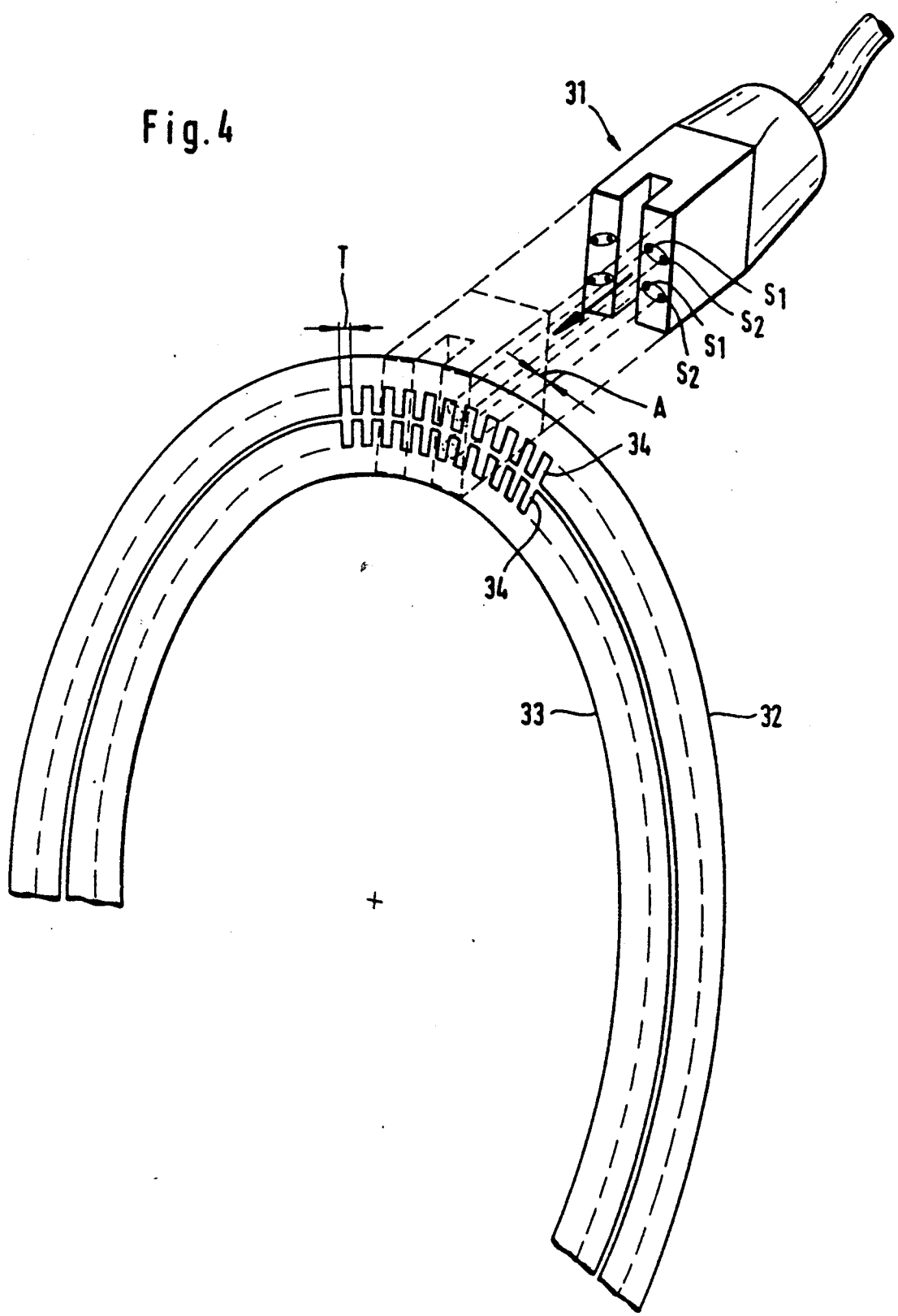
FIG. 4 shows a three-dimensional representation of a sensor unit.

FIG. 4 shows the general set-up of the sensor unit 31. Sensor unit 31 includes redundant double sensors S1, S2 which are grouped together in a horseshoe-shape and are arranged in pairs. Opposite these sensors S1, S2 are concentrically disposed sensor discs which act as transmitting elements 32, 33 for the recognition of the sense of rotation. The first sensor disc 33 is positioned within the second sensor disc 32. The second sensor disc 32 is furnished with recesses 34 of equal signal distance pitch T at its internal circumference and the first sensor disc 33 at its external circumference. The recesses 34 are, for example, configured as tooth spaces which are aligned with each other in the neutral position of the steering wheel as shown in the illustration. With each sensor disc 32, 33 one pair of double sensors S1, S2 is associated which are aligned one above the other. In the event the steering wheel 3 is rotated, the second sensor disc 32 which is coupled to the steering wheel is rotated, and it will rotate with respect to the disc 33 because internal sensor disc 33 is mounted to toothed rim 10 of the power steering system shown in FIG. 6 and is in the rest position. Through the double sensor the relative rotation of the recesses 34 which results from this will lead to a steering angle signal representing respectively, the counterclockwise and clockwise turning circle of the steering wheel in order to activate the power steering system in a corresponding sense of rotation to assist the steering torque. Through tile toothed rim, a servomotor 5 which is illustrated in FIG. 6 will readjust the first sensor disc 33 of the manually controlled steering motion until the recesses 34 of the two sensor discs 32, 33 are re-aligned again.

Figure 5:
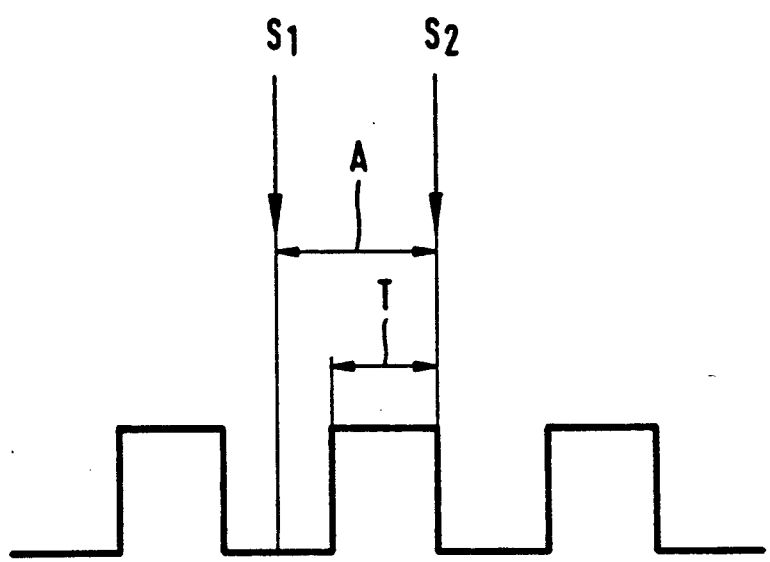
FIG. 5 shows a functional diagram for explanation of the monitoring of the rotational signal in reference to FIG. 4.

With reference to FIG. 5, an illustration of the monitoring of the sense of rotation is illustrated as a digital signal in a diagrammatic representation of the external sensor disc 32. The illustration is a diagram of voltage signals in terms of time. It has to be noted that for the unequivocal identification of the sense of the angle of rotation the sensor distance A between the two sensor elements S1, S2 of the double sensor which are disposed beside each other and which are marked out as vectors is larger than the signal distance pitch T of the recesses 34, respectively of the corresponding teeth and tooth spaces. In the preferred embodiment, the distance A is 1.5 times larger than the distance T. As a result, due to the different temporal sequence of the signal pattern, the sense of rotation of the steering wheel can be detected on the basis of a comparison of the signal sequence between the first and the second sensor elements S1, S2.

The readjustment and monitoring of the first, internal sensor disc 33, which is synchronously moved along by the servo steering device takes place analogously to what has been said before, which through a redundant second double sensor S1, S2 affords a temporal comparison of the signal sequence pattern with respect to the synchronization of the steering movement. The relative position of the first disc 33 with respect to the second sensor disc 32 is simultaneously monitored by means of an evaluating logic adapted to the desired steering servo characteristic within the framework of a computer-assisted master-slave system of an electronic control unit.

Figure 6:
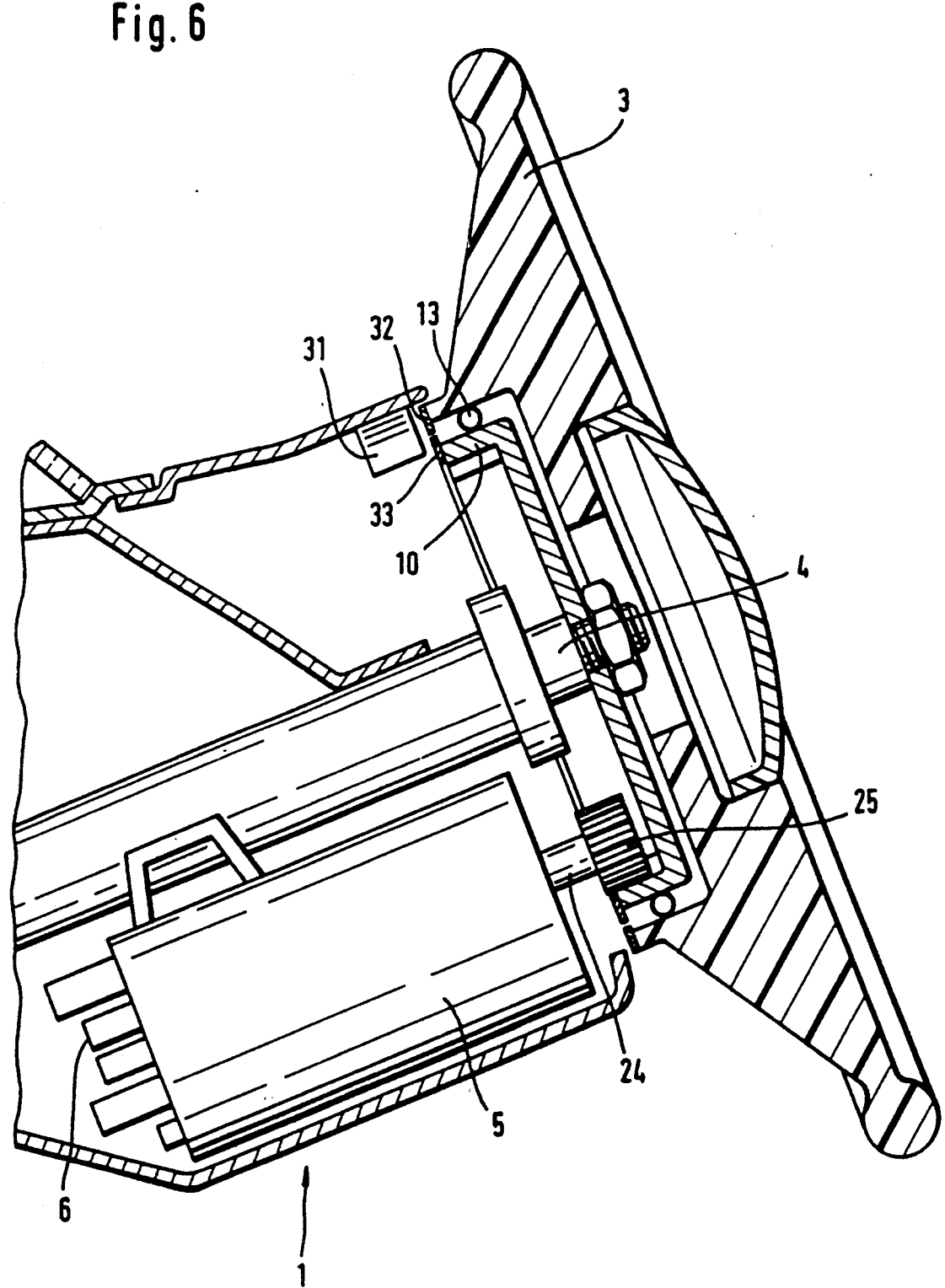
FIG. 6 shows an example of the arrangement of the sensor unit at the power steering system.

FIG. 6 shows an advantageous embodiment regarding the arrangement of the sensor measuring device at the power steering system 1 previously explained with reference to FIG. 1. The external, second sensor disc 32 is disposed at the steering wheel 3 while the internal, first sensor disc 33 is an integral component of the toothed rim 10. The sensor unit S1, S2 is spaced from sensor disc 32, 33 in the order of millimeters and preferably fixed adjacent to the steering column. The sensor unit operates, for example, by the Hall effect or by the magneto-resistive principle. The electronic system 6 of the motor is located directly at the electric servomotor 5 which generates a torque at the steering axle 4 which assists the rotary motion at the steering wheel 3. Both the servomotor 5 and the electronic system 6 of the motor are located directly at the steering wheel 3. In the illustrated embodiment in which the servomotor 5 is arranged beneath the steering axle, the steering wheel is furnished with an integrated toothed rim 10 having internal toothing. The toothed rim 10 is coupled to the steering wheel 3 through bearing 13. As has already been appreciated from FIG. 2 and from FIG. 3, bearing 13 is configurated as a catch, so that upon exceeding a defined angle of rotation a positive locking engagement is established between the steering wheel 3 and the toothed rim 10. The servomotor is provided with a driving shaft 24 to which a driving pinion 25 is coupled. The driving pinion 25 is in constant engagement with the internal toothing of the toothed rim 10.

When during operation the steering wheel 3 is turned into either of the two possible directions of rotation, then a rotation of the steering wheel 3 relative to the steering axle 4 and to the toothed rim 10 will result which will be recognized by the sensor unit. Over lines which are not illustrated in more detail in the drawing, this steering signal will be transmitted to the electronic system 6 of the motor. Accordingly, the electronic system 6 of the motor initiates the servomotor 5 which, depending upon the desired steering direction and on the corresponding steering torque, consequently generates an analogously directed assisting torque which is transmitted through the driving pinion 25 to the toothed rim 10. This torque which is transmitted through the toothed rim 10 to the steering axle 4 results in the auxiliary power which represents the servo assistance of the inventive power steering system 1 in the event of the manipulation of the steering wheel 3.

We claim:

1. A power steering system for vehicles with a passenger compartment, said power steering system comprising:
    a steering axle;
    a steering wheel rotatably disposed at an end of the steering axle;
    a steering gear adjacent to the steering wheel and coupled to the steering axle;
    an electric servomotor positioned in the passenger compartment and operatively coupled to the steering gear which generates a torque at the steering gear and at the steering axle assisting a rotary motion at the steering wheel; and
    an electronic system positioned in the passenger compartment, further comprising:
    a sensor unit for sensing torque applied to said steering wheel, said sensor unit including at least four sensor elements and two transmitting elements rotatable relative to each other and positioned concentrically with respect to the steering axle with a first of the transmitting elements attached to said steering gear and having an external circumference with a plurality of openings therein and a second of the transmitting elements attached to said steering wheel and having an internal circumference surrounding the external circumference and having a plurality of openings with a pitch equal to the pitch of the openings in the internal circumference whereby said sensor unit senses torque applied to the steering wheel.

2. A power steering system as claimed in claim 1, wherein said servomotor includes a motor casing and said electronic system is included within the servomotor casing.

3. A power steering system as claimed in claim 1 wherein the servomotor includes the electronic system and is mounted to a guide tube surrounding the steering axle proximate to the steering wheel.

4. A power steering system as claimed in claim 2, further comprising a sensor which with the servomotor and electronic system are positioned as one unit within a housing beneath the steering axle.

5. A power steering system as claimed in claim 1 further characterized by the steering gear including a toothed rim and the steering wheel having a recessed section disposed over and partially enclosing the toothed rim.

6. A power steering system as claimed in claim 5, wherein the toothed rim is mounted on the steering axle for rotation therewith.

7. A power steering system as claimed in claim 5 wherein the steering wheel is rotatably supported on the toothed rim by a bearing radially disposed therebetween.

8. A power steering system as claimed in claim 5 wherein the steering wheel and the toothed rim have operatively abutting stops as means for transmitting torque from the steering wheel to the steering axle when there is no torque generated by the servomotor.

9. A power steering system as claimed in claim 8, further comprising a sensor device operably providing a steering signal to the electronic system indicative of the sense of rotation of the steering wheel and the torque applied for initiating the servomotor.

10. A power steering system as claimed in claim 1, wherein the servomotor is a collector-free electric motor.

11. A power steering system as claimed in claim 1, wherein the sensor unit includes redundant sensor elements.

12. A power steering system as claimed in claim 1, wherein the sensor unit includes a first sensor element and a second sensor element having a distance (A) therebetween which is preferably 1.5 times larger than a distance pitch (T) which is formed by the openings in the transmitting elements.

13. A power steering system as claimed in claim 1, wherein one of said transmitting elements is mounted to said steering wheel and the other transmitting element is mounted to the toothed rim.

14. A power steering system for vehicles with a passenger compartment, said power steering system comprising:
- a steering axle;
- a steering gear rigidly coupled to the axle for rotation therewith and having means defining a toothed rim;
- a steering wheel having means defining a recessed section rotatably disposed over the steering gear whereby the recessed section partially encloses the toothed rim;
- stops between the steering gear and the steering wheel operatively abutting to limit rotation therebetween;
- a servomotor drivingly engaging the gear;
- a first transmitting element rotatably fixed to the steering gear and having means defining a plurality of openings at an external circumference;
- a second transmitting element rotatably fixed to the steering wheel and having means defining a plurality of recesses in an internal circumference circumscribing and concentric with the first transmitting element external circumference wherein the second transmitting element recesses are adapted for operably alignment with the first transmitting element recesses;
- a sensor unit having at least four sensor elements with two of the sensor elements located to produce a signal in response to the movement of the openings of the first transmitting element past the sensor and with the remaining two sensors located to produce a signal in response to the openings of the second transmitting element moving past those sensors; and
- an electronic system electrically connected to the sensor unit and to the servomotor and initiating the servomotor in response to signals from the sensor unit.

15. A power steering system as claimed in claim 14 further comprising a ball bearing radially disposed between the recessed section of the steering wheel and the steering gear and adapted to both facilitate rotation therebetween and provide axial retention therebetween.

* * * * *